United States Patent [19]

Frank

[11] Patent Number: 5,450,453
[45] Date of Patent: Sep. 12, 1995

[54] METHOD, APPARATUS, AND SYSTEM FOR DECODING A NON-COHERENTLY DEMODULATED SIGNAL

[75] Inventor: Colin D. Frank, Schaumburg, Ill.

[73] Assignee: Motorola, Inc., Schaumburg, Ill.

[21] Appl. No.: 313,974

[22] Filed: Sep. 28, 1994

[51] Int. Cl.⁶ .................. H04B 1/69; H04B 1/707; H04J 13/04
[52] U.S. Cl. .................... 375/200; 375/205; 375/206; 375/340; 375/341; 370/18; 370/19; 370/21; 370/22; 371/43; 380/34
[58] Field of Search ............ 375/1, 67, 83, 94; 380/34; 371/43; 370/18, 19, 21, 22

[56] References Cited

U.S. PATENT DOCUMENTS

| | | | |
|---|---|---|---|
| 4,908,836 | 3/1990 | Rushforth et al. | 375/1 |
| 5,159,608 | 10/1992 | Falconer et al. | 375/1 |
| 5,193,102 | 3/1993 | Meidan et al. | 375/1 |
| 5,204,874 | 4/1993 | Falconer et al. | 375/1 |
| 5,233,630 | 8/1993 | Wolf | 375/67 |
| 5,325,402 | 6/1994 | Ushirokawa | 375/94 |

OTHER PUBLICATIONS

"Performance of Power-Controlled Wideband Terrestrial Digital Communication", A. J. Viterbi, A. M. Viterbi, Ephraim Zehavi, IEEE TRansactions on Communications, vol. 41, No. 4, Apr. 1993.

Principles of Spread Spectrum Multiple Access Communication, A. J. Viterbi, 1993 Qualcomm Incorporated, Nov. 16, 1993, Chapter 4, pp. 73–122.

Primary Examiner—Bernarr E. Gregory
Attorney, Agent, or Firm—Darleen J. Stockley

[57] ABSTRACT

Non-coherently demodulated signals are efficiently decoded using a non-complex system that is independent of the fading statistics of the channel. A symbol metric calculator (406) receives a signal-to-noise ratio (404) and symbols from a non-coherently demodulated signal (402) to efficiently produce weighted symbol metrics (408). A symbol metric deinterleaver (410) is then used to deinterleave the weighted symbol metrics. A decoder (414) produces a decoded bit sequence (416) based on the deinterleaved weighted symbol metrics (412).

16 Claims, 5 Drawing Sheets

METHOD, APPARATUS, AND SYSTEM FOR DECODING A NON-COHERENTLY DEMODULATED SIGNAL

FIELD OF THE INVENTION

The present invention relates to receiver design in a spread spectrum communication system which employs binary convolutional coding and orthogonal modulation and, more particularly, to decoding non-coherently demodulated signals.

BACKGROUND

In a spread spectrum communication system, a modulation technique is utilized in which a transmitted signal is spread over a wide frequency band within the communication channel in order to increase the number of simultaneous users in a communication channel without decreasing performance. The baseband signal (e.g., a voice signal with a bandwidth of only a few kilohertz) will be transformed into a signal which occupies and is transmitted over a frequency band that may be many megahertz wide. This is accomplished by spreading the signal to be transmitted with a spreading code. These spreading codes include, but are not limited to, pseudo-noise (PN) codes and Walsh codes. A Walsh code corresponds to a single row or column of the Hadamard matrix. For example, a dimension 64 channel Hadamard matrix yields 64 mutually orthogonal Walsh codes. A typical spread spectrum transmission includes a transmitter for expanding the bandwidth of an information signal and transmitting the expanded signal and a receiver for recovering the desired information signal by remapping the received spread spectrum into the original information signal's bandwidth.

The receiver in the spread spectrum communication system will generally include a method to demodulate the transmitted signal and a method to decode the demodulated signal. An optimal decoding metric can be computed but is undesirable because of its complexity. The performance of the previous decoding methods is significantly worse than that of the optimal metric, and previous decoding methods require knowledge of the fading statistics of the channel.

Accordingly, there is a need for a method, decoder circuit, and system for decoding a non-coherently demodulated signal, wherein the method, decoder circuit, and system are less complex than the optimal method, yield better performance than previous methods, and are independent of the fading statistics of the channel.

DETAILED DESCRIPTION OF THE PREFERRED EMBODIMENT

Generally, the present invention provides a method, decoder circuit, and system for decoding a non-coherently demodulated signal by using a decoder metric which yields better performance than the prior art, is less complex than the optimal method, and is independent of the fading statistics of the channel. The symbol metric calculator receives a signal-to-noise ratio and symbols from a nonocoherently demodulated signal to efficiently produce weighted symbol metrics. A symbol metric deinterleaver is then used to deinterleave the weighted symbol metrics. A decoder produces a decoded bit sequence based on the deinterleaved weighted symbol metrics. With such a method, apparatus, and system the received signal is decoded more efficiently than previous techniques.

Figure 1:
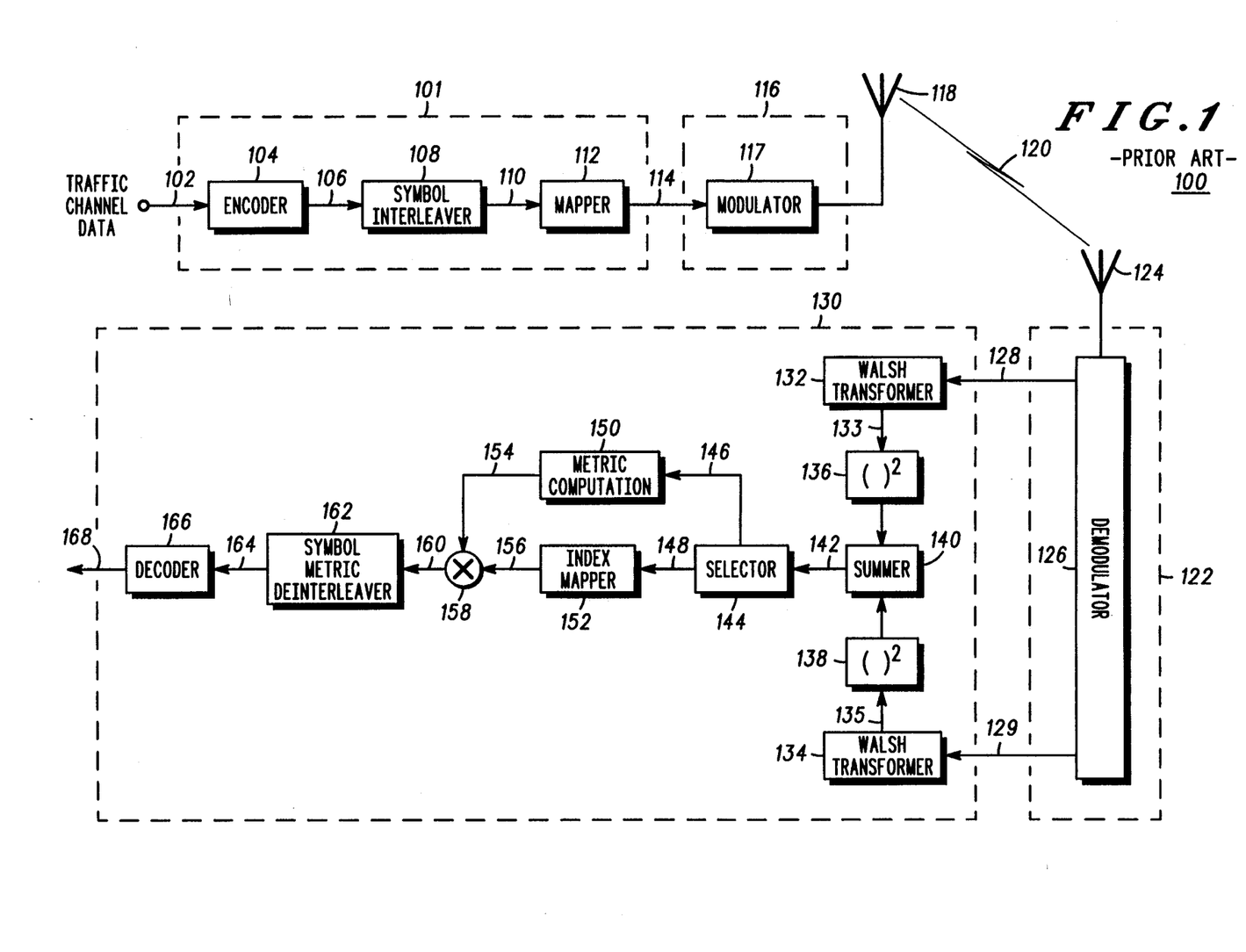
FIG. 1 is a prior art communication system that uses binary convolutional coding and orthogonal modulation.

The present invention is more fully described with reference to FIGS. 1-6. FIG. 1, numeral 100, is a prior art communication system that uses binary convolutional coding and orthogonal modulation. In the encoding portion (101) of the communication system, traffic channel data bits (102) are input to an encoder (104) at a particular bit rate (e.g., 9.6 kbits/second). The input traffic channel data bits can include either voice converted to data by a vocoder, pure data, or a combination of the two types of data. Encoder (104) encodes the input data bits (102) into data symbols at a fixed encoding rate with an encoding algorithm which facilitates subsequent maximum-likelihood decoding of the data symbols into data bits (e.g., convolutional or block coding algorithms). For example, encoder (104) encodes input data bits (102) (received at a rate of 9.6 kbits/second) at a fixed encoding rate of one data bit to three data symbols (i.e., ⅓) such that the encoder (104) outputs data symbols (106) at a 28.8 ksymbols/second rate.

The data symbols (106) are then input into a symbol interleaver (108). The symbol interleaver (108) is a block interleaver which interleaves the input data symbols (106) individually as opposed to a block interleaver which groups the data symbols into sets which are kept together during interleaving. In the symbol interleaver (108), the data symbols are individually input into a matrix so that the matrix is filled in a column by column manner. The data symbols are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. The interleaved data symbols (110) are output by the symbol interleaver (108) at the same data rate that they were input (e.g., 28.8 ksymbols/second). The predetermined size of the block of data symbols defined by the matrix is derived from the maximum number of data symbols which can be transmitted at a predetermined chip rate within a predetermined length transmission block. For example, if data symbols (106) are output from the encoder (104) at a 18.8 ksymbols/second rate, the chip rate for transmitting those data symbols (106) is 228.8 ksymbols/second. If, for example, the predetermined length of the transmission block is 20 milliseconds, the predetermined size of the block of data symbols is 28.8 ksymbols/second times 20 milliseconds which equals 576 data symbols. A matrix of dimension 18 by 32 exactly accommodates these 576 data symbols.

The interleaved data symbols (110) are then input to a mapper (112). The mapper (112) derives a sequence of fixed length orthogonal codes (114) (e.g., 64-ary Walsh codes) from the interleaved data symbols (110). For example, in 64-ary orthogonal signaling, the interleaved data symbols (110) are grouped into sets of six in order to select one of the 64 orthogonal codes to represent the set of six data symbols. These 64 orthogonal codes preferably correspond to Walsh codes from a 64 by 64 Hadamard matrix wherein a Walsh code is a single row or column of the matrix. The mapper (112) outputs a sequence of Walsh codes (114) which correspond to the input data symbols (110) at a fixed symbol rate (e.g., 307.2 ksymbols/second).

The sequence of Walsh codes (114) is output from the encoding portion (101) of the communication system and input to a transmitting portion (116) of the communication system. The sequence (114) is prepared for transmission over a communication channel by a modulator (117). Subsequently, the modulated sequence is provided to an antenna (118) for transmission over the communication channel (120).

The modulator (117) preferably prepares the sequence (114) for direct sequence code divided spread spectrum transmission by spreading the sequence (114) with a long spreading code (e.g., pseudonoise (PN)). The spreading code is a user specific sequence of symbols or unique user code which is output at a fixed chip rate (e.g., 1.228 Mchips/second). The long spreading code allows the transmission of different users to be separately demodulated even though the transmissions occupy the same bandwidth. The unique user code also enhances the security of the communication in the communication channel by scrambling the encoded traffic channel Walsh codes. In addition, the code spread Walsh symbols are spread by a pair of short spreading codes (i.e., short when compared to the long spreading code) to generate separate I-channel and Q-channel code spread sequences. The I-channel and Q-channel code spread sequences are used to bi-phase modulate a quadrature pair of sinusolds. The modulated sinusolds are summed, bandpass filtered, translated to an RF frequency, amplified, filtered and radiated by an antenna (118) to complete transmission of the traffic channel data bits (102) in a communication channel (120).

A receiving portion (122) of the communication system receives the transmitted spread spectrum signal from over the communication channel (120) through antenna (124). The received signal is sampled into data samples by demodulator (126). Subsequently, the data samples (128) and (129) are output to the decoding portion (130) of the communication system.

The demodulator (126) preferably samples the received spread spectrum signal by filtering, demodulating, translating from the RF frequency, and sampling at a predetermined rate (e.g., 1.2288 Msamples/second). Subsequently, the in-phase sampled signal and quadrature sampled signal are independently despread by correlating the received sampled signals with the short spreading codes and the long spreading code. As the spreading factor of the long code is four, the despread samples are partitioned into blocks of four and summed. Combining samples in this manner reduces the sample rate by a factor of four to a sample rate equal to the Walsh chip rate which is 307.2 chips/second.

The in-phase (128) and quadrature (129) sampled signals are independently input to a decoding portion (130) of the communication system which non-coherently detects/decodes the sampled signals (128). In order to decode the sampled signals (128 and 129), predetermined length groups (e.g., 64 sample length groups) of sampled signals are independently input to orthogonal code transformers (132 and 134, respectively) (e.g., fast Hadamard transformers) The orthogonal code transformers (132 and 134) output a plurality of output signals (133 and 135, respectively) (i.e., when 64 sample length groups are input, then 64 transformer output signals are generated). Each transformer output signal corresponds to a measure of confidence that the sampled signals correspond to a particular orthogonal code from within a set of mutually orthogonal codes. In addition, each transformer output signal has an associated index which indicates which particular orthogonal code within the set of mutually orthogonal codes corresponds to the transformer output signal (i.e., when 64 sample length groups are input, the 6 bit index is the sequence of six data symbols which map into the particular length 64 bit length orthogonal code). Subsequently, each transformer output signal within the groups of transformer output signals (133 and 135) is squared by the transformer output squaring mechanisms (136 and 138, respectively). A set of decision values (142), equal in number to the number of Walsh codewords, is then generated by adding mechanism (140) which adds together each pair of squared transformer output signals (i.e., one from each of the transformer output signal squaring mechanisms (136 and 138)) having an associated index which indicates that the transformer output signals correspond to the same orthogonal code.

The group of decision values (142) and associated index data symbols are input to a selection mechanism (144) which selects the maximum decision value from the group of decision values (142). The selected decision value (146) is input to a metric computation mechanism (150) which scales the selected decision value to a value (154) which is used to form metrics for the individual data symbols which are subsequently used to form transition metrics for maximum-likelihood decoding techniques. The index (a sequence of binary symbols) associated with the selected decision value (148) is determined by the mapping mechanism (152). Multiplier (158) multiplies each index symbol (156) by the scaling factor (154) to form a symbol metric (160) for each data symbol. The symbol metrics are formed at a rate equal to the data symbol rate at the output of the encoder.

The data symbol metrics (160) are then input into a symbol metric deinterleaver (162) which deinterleaves the data symbol metrics (160) at the individual symbol level. In the symbol metric deinterleaver (162), the symbol metrics are individually input into a matrix which defines a predetermined size block of soft decision data. The matrix of symbol metrics is filled in a row by row manner. The deinterleaved symbol metrics (164) are individually output from locations within the matrix so that the matrix is emptied in a column by column manner. The deinterleaved symbol metrics (164) are output by the symbol metric deinterleaver (162) at the same rate that they were input (e.g., 28.8 kmetrics/second). The dimension of the symbol metric deinterleaver is the same as the dimension of the symbol interleaver since it inverts the operation of the symbol interleaver and there is one symbol metric for each data symbol.

The deinterleaved symbol metrics (164) are input to a decoder (166) which uses maximum-likelihood decoding techniques to estimate the traffic channel data bits (168). The maximum-likelihood decoding techniques may be augmented by using an algorithm which is substantially similar to a Viterbi decoding algorithm. The decoder (166) uses a group of the data symbol metrics (154) to form a metric for each possible state transition within the maximum-likelihood sequence estimation decoder (166). The number of deinterleaved symbol metrics (164) used to form each set of transition metrics is equal to the number of data symbols (106) generated at the output of the convolutional encoder (104) from each input data bit (102). The number of transition metrics in each set is equal to two raised to the power of the number of data symbols (106) generated at the output of the convolutional encoder (104) from each input data bit (102). For example, when a rate $\frac{1}{3}$ convolutional encoder is used in the transmitter, three data symbols (106) are generated from each input data bit (102). Thus decoder (166) uses groups of three deinterleaved symbol metrics (164) to form eight transition metrics for use at each time state in the maximum-likelihood sequence estimation decoder (166). The estimated data bits (168) are generated at a rate equal to the data rate at the input to the decoder.

Thus a prior art communication system for using binary convolutional coding and orthogonal modulation in encoding and decoding has been described above with reference to FIG. 1, numeral 100. In summary, the prior art communication system includes a first portion (101 and 116) which encodes input data bits into data symbols, interleaves the data symbols in a symbol by symbol manner, maps the interleaved symbols into orthogonal codes, modulates and transmits the orthogonal codes over a communication channel. The prior art communication system further includes a second portion (122 and 130) which receives and demodulates a signal from over the communication channel, transforms groups of samples of the demodulated signal into a group of measures of confidence that each particular group of samples corresponds to a particular orthogonal code from within a set of mutually orthogonal codes, selecting the one largest measure of confidence and an index data symbol which identifies the particular orthogonal code corresponding to the selected measure of confidence, generating data symbol metrics from each selected measure of confidence and associated index data symbol, deinterleaving the data symbol metrics within each received transmission block, subsequently generating transition metrics from groups of deinterleaved individual symbol metric, and generating estimated data bits from the transition metrics, by using maximum-likelihood decoding techniques.

Figure 2:
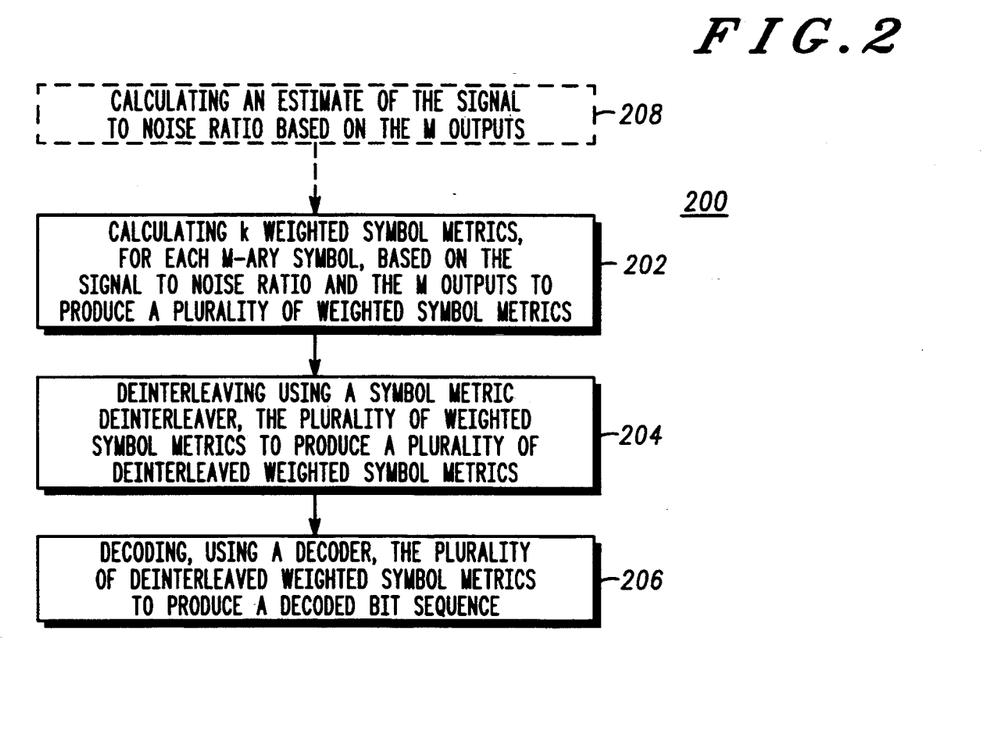
FIG. 2 is a flow diagram for implementing a method for decoding a received signal in accordance with the present invention.

FIG. 2, numeral 200, is a flow diagram for implementing a method for decoding a received signal in accordance with the present invention. If a signal-to-ratio (SNR) is not available, an SNR estimate is calculated based on M outputs from a non-coherent demodulation of a received signal (208). Then, k weighted symbol metrics (wherein k is a number of data symbols) are calculated, for each M-ary symbol, using the signal-to-noise ratio or the SNR estimate of the received signal and M outputs from the non-coherent demodulation of the received signal (202). Then, the weighted symbol metrics are deinterleaved (204) and input into the decoder. The decoder uses the deinterleaved symbol metrics to produce a decoded bit sequence(206). More description of these steps is given below. Where the transmitted signal is convolutionally encoded, the decoder is typically a Viterbi decoder. For a block encoded signal, corresponding soft-decision decoding block decoding algorithms can be employed. The output of the decoder is the binary input sequence corresponding to the decoded codeword.

Figure 3:
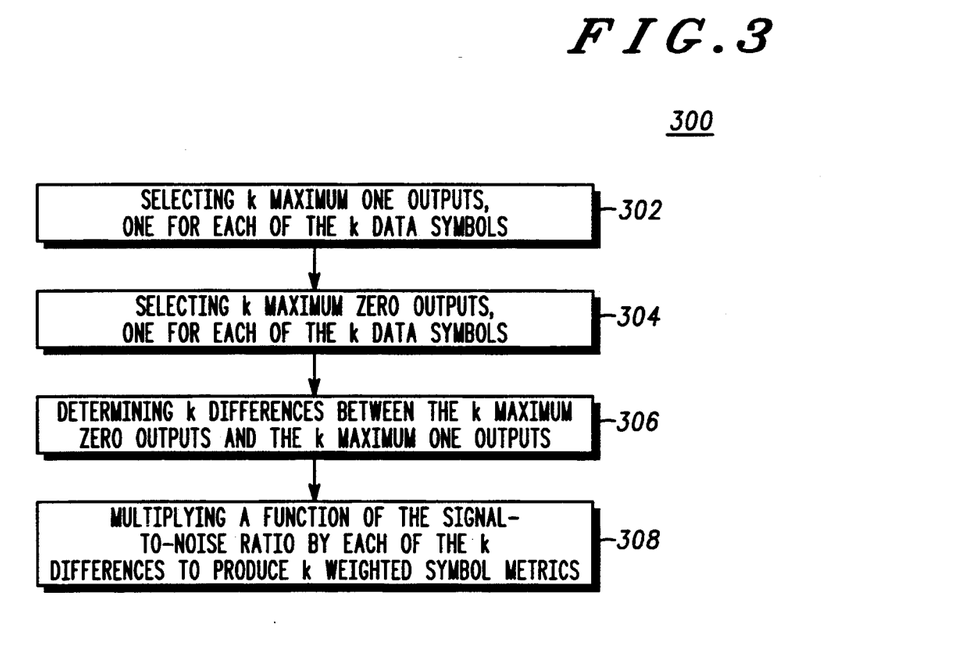
FIG. 3 is a flow diagram, shown with greater detail, of the step of calculating k weighted symbol metrics in accordance with the present invention.

FIG. 3, numeral 300, is a flow diagram of the step of calculating k weighted symbol metrics, shown with greater detail, in accordance with the present invention. First, for each of the k data symbols corresponding to particular received M-ary codeword, a maximum one output is selected that is the largest of the M outputs representing symbols for which the corresponding data symbol is a one (302), and a maximum zero output is selected that is the largest of the M outputs representing symbols for which the corresponding data symbol is a zero (304). Then for each of the k data symbols, a difference is taken between the maximum zero output and the maximum one output (306). The k differences corresponding to the k data symbols are subsequently multiplied by a function of the signal-to-noise ratio (SNR) for the power control group to produce k weighted symbol metrics (308). For many applications the SNR may need to be estimated. The multiplication of the difference by the estimate of the SNR is an approximation of the log-likelihood ratio. Multiplication by a function of the estimate of the SNR, such as the square root, may also be used as an approximation of the log-likelihood ratio to yield a better decoder performance. More description of these steps is given below.

Figure 4:
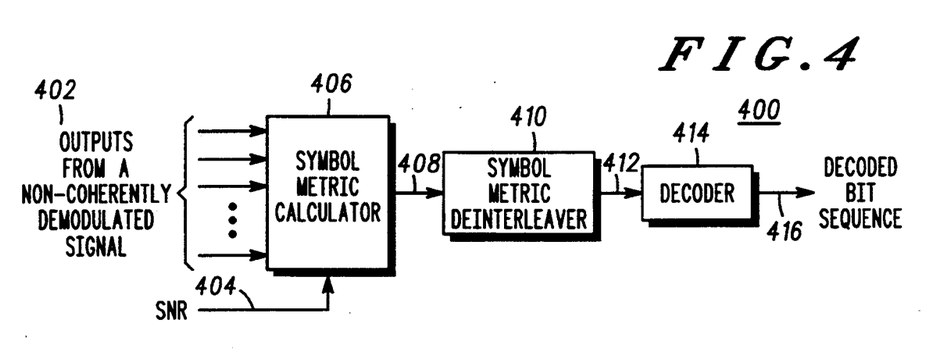
FIG. 4 is a block diagram of a decoding circuit implemented in accordance with the present invention.

FIG. 4, numeral 400, is a block diagram of a decoding circuit implemented in accordance with the present invention. The decoding circuit (400) includes a symbol metric calculator (406), symbol metric deinterleaver (410), and a decoder (414). The symbol metric calculator (406) receives outputs from a non-coherently demodulated signal (402) and a signal-to-noise ratio (404). The outputs from a non-coherently demodulated signal (402) will typically either be the squared outputs of a single M-ary non-coherent demodulator, or the square-law combination of the outputs of several M-ary demodulators. This latter case, in which the outputs of several M-ary demodulators are combined would correspond to instances when diversity is available to the receiver, such as in the case of the IS-95 system where the multipath nature of the channel provides diversity. The signal-to-noise ratio (404) is required in the calculation of the weighted symbol metric (408). The signal-to-noise ratio weighting employed by the weighted symbol metric (408) is only necessary for a channel in which the signal-to-noise ratio is time-varying. The signal-to-noise ratio is approximately constant over a power control group (six Walsh symbols), allowing estimation of the average signal-to-noise ratio for the power control group. In systems in which the signal-to-noise ratio varies more slowly or more rapidly, the method for estimating the signal-to-noise ratio is modified accordingly. The symbol metric calculator (406) produces weighted symbol metrics (408) based on the outputs from a non-coherently demodulated signal (402) and the SNR (404). The weighted symbol metrics provided by the symbol metric calculator are passed to the symbol metric deinterleaver (410) to produce deinterleaved weighted symbol metrics (412). The deinterleaved weighted symbol metrics (412) are passed to the decoder (414). The decoder (414) uses the deinterleaved weighted symbol metrics to produce a decoded bit sequence(416). Where the transmitted signal is convolutionally encoded, as in IS-95, the decoder (414) typically is a Viterbi (maximum-likelihood) decoder. If some other type of block encoding is performed by the transmitter, corresponding block decoding methods are utilized. These block decoding methods include both maximum-likelihood decoding and methods which provide near maximum-likelihood decoding performance. The output (416) of the decoder (414) is a binary sequence corresponding to the decoded codeword.

Figure 5:
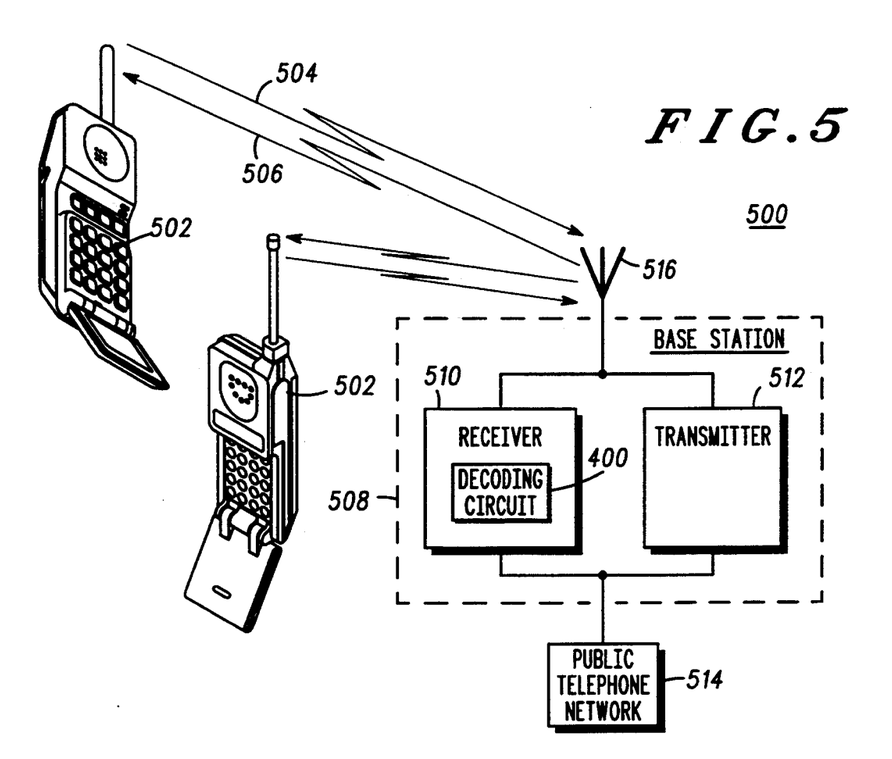
FIG. 5 is a graphic illustration of a communication system that uses a decoding circuit for decoding received signals in accordance with the present invention.

FIG. 5, numeral 500, is a graphic illustration of a communication system that uses a decoding circuit (400) for decoding received signals in accordance with the present invention. Examples of communication systems are cellular telephone systems and personal communication systems. The communication system (500) includes communication units (502), a base station (508), and interfaces to the public telephone network (514). The base station (508) uses a forward link (506) from an antenna (516) as the channel resource to communicate with the communication unit (502). The communication unit (502) uses a reverse link (504) to the antenna (516) as the channel resource to communicate with the base station (508). The base station (508) is shown with a receiver (510) that utilizes a decoding circuit (400) in accordance with the present invention for receiving communications from the communication units (502) and a transmitter (512) for sending communications to the communication units (502).

Figure 6:
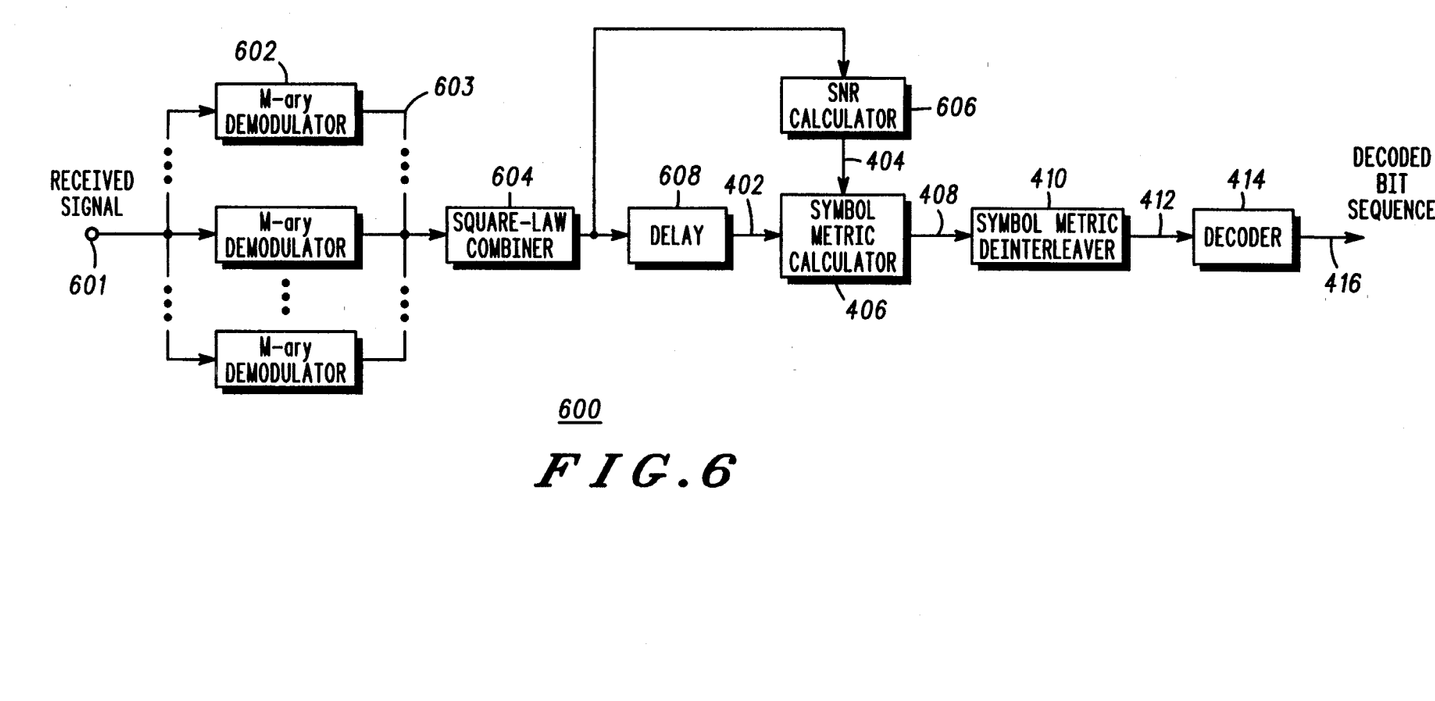
FIG. 6 is a block diagram of one embodiment of a receiver implemented in accordance with the present invention.

FIG. 6, numeral 600, is a block diagram of one embodiment of a receiver implemented in accordance with the present invention. The system (600) includes one or more M-ary demodulators (602) for demodulating the received signal (601). Each M-ary demodulator (602) non-coherently demodulates a separate multipath component of the received signal (601) and produces M outputs (603). The M outputs (603) are combined using a square-law combiner (604). The output of the square-law combiner (604) is then delayed by delay element (608) before being input to the symbol metric calculator (406). The symbol metric calculator (406) receives the delayed output (402) from the square-law combiner (604) and a signal-to-noise ratio estimate (SNR) (404) from the SNR calculator (606). The signal-to-noise ratio estimate (404) is derived from the output of the square-law combiner (604). The symbol metric calculator (406) uses the SNR estimate (404) and the delayed output (402) from the square-law combiner (604) to produce the weighted symbol metrics (408). The weighted symbol metrics (408) are deinterleaved by the symbol metric deinterleaver (410). The output of the symbol metric deinterleaver (412) is used by the decoder (414) to produce the decoded bit sequence(416).

The received signal (601) is representative of the signals received by the antenna (516) in FIG. 5, numeral 500. The communication channel is generally a multipath channel so that the received signal is the linear sum of several delays of the transmitted signal. In addition to introducing multipath, the channel also corrupts the signal by adding additive white Gaussian noise of one-sided spectral density NO. As a consequence of the long code pseudonoise (PN) spreading employed by the transmitter, multipath components having delays separated by delays caused by more than one chip may be demodulated without interfering with each other.

Figure 7:
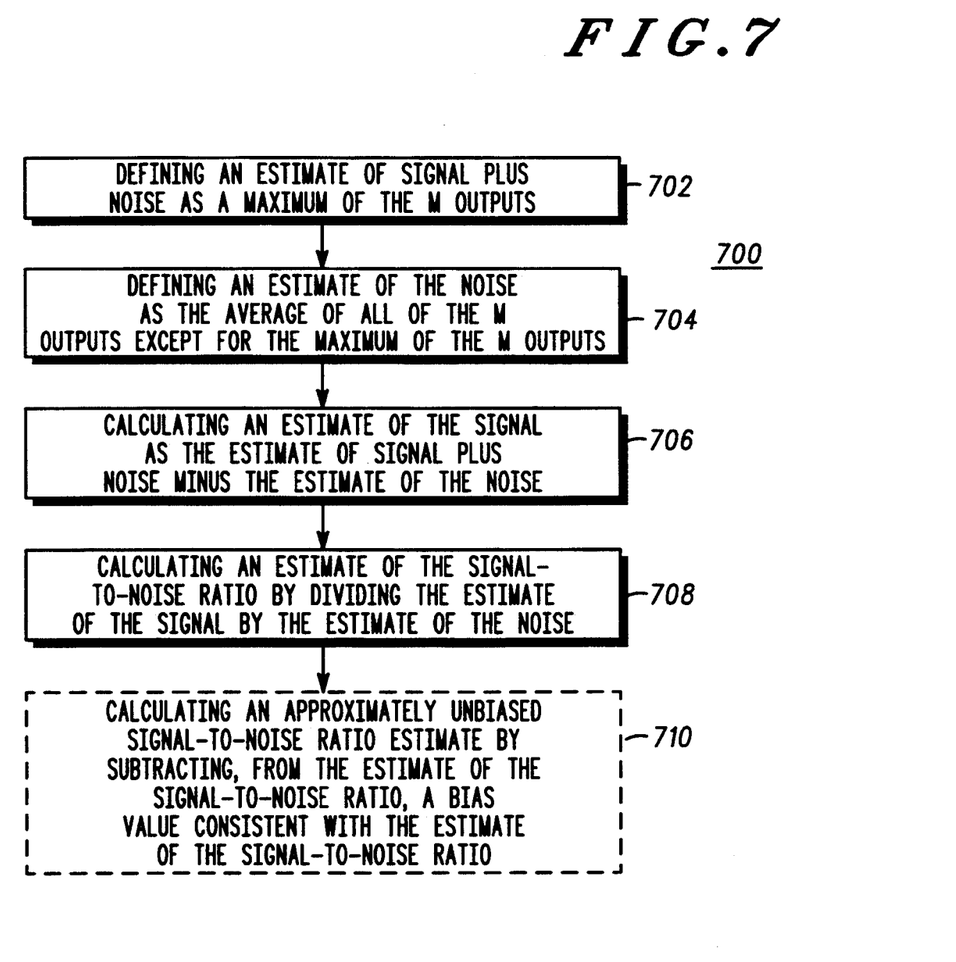
FIG. 7 is a flow diagram, shown with greater detail, of the step of calculating an estimate of the signal-to-noise ratio in accordance with the present invention.

FIG. 7, numeral 700, is a flow diagram of the step of calculating an estimate of the signal-to-noise ratio, shown with greater detail, in accordance with the present invention. First, an estimate of signal plus noise is defined as a maximum of the M outputs (702). Then, an estimate of the noise is defined as the average of all of the M outputs except for the maximum of the M outputs (704). Then, an estimate of the signal is calculated as the estimate of signal plus noise minus the estimate of the noise (706). Then, an estimate of the signal-to-noise ratio is calculated by dividing the estimate of the signal by the estimate of the noise (708). An optional final step, of calculating an approximately unbiased signal-to-noise ratio estimate by subtracting, from the estimate of the signal-to-noise ratio, a bias value consistent with the estimate of the signal-to-noise ratio (710), may also be added. More description of these steps is given below.

There are several unique aspects of this system with respect to the symbol metric calculator (406). First, the power control is employed on the reverse link in order to maintain the power received by the base station at an approximately constant level. Power control is implemented by partitioning the reverse link transmission into power control groups. Typically, a power control group consists of 6 Walsh symbols so that there are 16 power control groups per 20 millisecond traffic frame. The base station measures the power received over a power control group and then commands the mobile to increment or decrement the transmitted power by a fixed increment (e.g., 1 dB), depending on whether the measured power was above or below the desired threshold. Note that the base station must estimate the signal-to-noise ratio for the power control group in order to implement power control.

In a communication system in which the SNR is not constant over the duration of a frame, the decoded performance, i.e., frame error rate and bit error rate can be greatly enhanced if the instantaneous SNR is known and is exploited in the decoding process. In the present invention, the SNR is approximately constant over the duration of the power control group is utilized. The SNR is only approximately constant for two reasons. The first reason is that while the transmitter power is held constant for the duration of the power control group, the fading due to the channel is a continuous random process. Thus, although the transmitted power of the desired transmission is held constant for the duration of the power control group, the energy received by the base station may not be constant. The second reason that the SNR is only approximately constant over the duration of a power control group is that the interference is also time-varying. If the power control groups of the interfering transmissions are aligned with that of the desired power control group, the transmitted energy of the interference is constant over the duration of the power control group. However, the interference is also subject to a time varying fading process so that the energy of the interference received at the base is not constant. However, while the SNR may vary within the power control group, there is much less variation of the SNR within the power control group than within the 16 power control groups which constitute a frame.

Let the vector $z^{(p)} = (z_1^{(p)}, z_2^{(p)}, \ldots z_M^{(p)})$ denote the vector output of the square-law combiner (604) for the p-th M-ary symbol within the power control group, $1 \leq p \leq 6$. We then have the estimates $$\hat{N}_0^{(p)} = \sum_{\{k: z_k^{(p)} \neq z_{max}^{(p)}\}} z_k^{(p)}/63 \qquad \hat{E}_W^{(p)} = z_{max}^{(p)} - \hat{N}_0^{(p)},$$

of the noise and signal, respectively, for the p-th M-ary symbol, where $z_{max}^{(p)} = \max\{z_k^{(p)}\}$. One estimate $\hat{E}_W/\hat{N}_0$ for the power control group is then given by $$\hat{E}_W/\hat{N}_0 = \left( \sum_{1 \leq p \leq 6} \hat{E}_W^{(p)} \right) \Big/ \left( \sum_{1 \leq p \leq 6} \hat{N}_0^{(p)} \right).$$

The rationale for this estimate is that the largest output of the square-law combiner (604) usually corresponds to the transmitted Walsh symbol. Of course, the largest output does not always correspond to the transmitted Walsh symbol, especially when the SNR is small. For this reason, the mean of the estimate $\hat{E}_W$ is always greater than the actual value $E_W$, and the mean of the estimate $\hat{N}_0$ is always less than the actual value $N_0$. The bias of $\hat{N}_0$ is very small due to the number of samples used to form the estimate. For this same reason, the variance of $\hat{N}_0$ is small also. Since the bias of the estimate $\hat{E}_W$ w is a function of $N_0$, an approximately unbiased estimate $\hat{E}_{W,u}$ can be achieved by subtracting the bias consistent with the estimated noise level $\hat{N}_0$ from the estimate of $\hat{E}_W$. The estimates $\hat{E}_{W,u}$, $\hat{N}_0$, and SNR estimate $\hat{E}_{W,u}/\hat{N}_0$ constitute the contents of the SNR calculator (606).

There is an alternative method for estimating the SNR which yields better performance in some instances. In this alternative method, the noise is estimated as before; that is, all the outputs of the demodulator other than the largest are based upon noise only. An estimate of the noise density is computed by averaging the demodulator outputs for the entire power control group which are in correspondence with noise. Note that since the number of noise outputs in a power control group is typically 378, the noise estimate is corrupted only slightly if the largest demodulator output for one or more symbols of a power control group do not correspond to the transmitted signal. The noise estimate is used to normalize the largest demodulator output. The maximum-likelihood estimate of the signal-to-noise ratio is then given by $\hat{E}_{W,ml}/\hat{N}_0$, where $$\hat{E}_{W,ml}/\hat{N}_0 = x\max \; prob(z_{max} | N_0 = \hat{N}_0, E_W = x).$$

The conditional density of the largest demodulator output as a function of the normalized signal energy depends only on the number of multipath components combined in the receiver. The receiver has knowledge of the number of multipath components combined because the receiver controls this value. The maximum-likelihood estimate of the signal-to-noise ratio can be implemented using a table lookup procedure. A separate table is required for each multipath component.

With respect to the symbol metric calculator (406), typically for an arbitrary M-ary symbol q with binary representation $(b_{q,1}, b_{q,2}, \ldots b_{q,6})$ a metric is assigned to each bit of the binary representation of q for use in the Viterbi decoder (414).

The optimal decoding metric for a Viterbi decoder is the log-likelihood ratio, defined below. For each index i, $1 \leq i \leq 6$, let $S_0^i$ denote the set of M-ary symbols for which the binary representation has a 0 in the i-th location and let $S_1^i$ denote the complementary set. The log-likelihood ratio for a binary symbol $b_i$ in the i-th location of the binary representation of an M-ary symbol is given by $$\log\left( \frac{p_0^i(b_i, z)}{p_1^i(b_i, z)} \right) = (-1)^{b_i} \log \left( \frac{\sum\limits_{j \in S_0^i} z_j^{(m-1)/2} I_{m-1}(2\sqrt{2z_j E_w/N_0})}{\sum\limits_{j \in S_1^i} z_j^{(m-1)/2} I_{m-1}(2\sqrt{2z_k E_w/N_0})} \right).$$

where $I_a(x)$ denotes the a-th order modified Bessel function of the first kind, and z is the output of the square-law combiner (604).

This optimal receiver metric is too complicated to implement due to the number and complexity of the calculations involved. An alternative metric which is simpler to implement is set forth below. Let $z_{j,max}^i$ denote the largest element of the set $S_j^i$. Refer to the log-likelihood ratio above. Since the summations of the numerator and denominator are dominated by the terms corresponding to the largest elements of $S_0^i$ and $S_1^i$ respectively, either of two alternatives set forth below for simplifying the metric computation may be used. The first alternative is approximation of the numerator and the denominator by their maximum terms. However, since the resulting approximation will depend only on $z_{0,max}^i$ and $z_{1,max}^i$, a more direct approach is to determine a log-likelihood ratio for the binary symbol $b_i$ which exploits only the quantities $z_{0,max}^i$ and $z_{1,max}^i$. The log-likelihood ratio for $b_i$ based only on $z_{0,max}^i$ and $z_{1,max}^i$ is given by $$\log\left( \frac{p_0^i(b_i, z_{0,max}^i = x, z_{1,max}^i = y)}{p_1^i(b_i, z_{0,max}^i = x, z_{1,max}^i = y)} \right) = (-1)^{b_i} \log \left( \left( \frac{f_{nc}^m(x) F_c^m(x) + \left(\frac{M}{2} - 1\right) F_{nc}^m(x) f_c^m(x)}{f_{nc}^m(y) F_c^m(y) + \left(\frac{M}{2} - 1\right) F_{nc}^m(y) f_c^m(y)} \right) \frac{f_c^m(y) F_c^m(y)}{f_c^m(x) F_c^m(x)} \right).$$

In the above, $$f_c^m(x) = \frac{x^{m-1} e^{-x}}{(m-1)!}, \; F_c^m(x) = 1 - e^{-x} \sum_{j=1}^{m} \frac{x^{j-1}}{(j-1)!}$$

$$(x/2(E_w/N_0))^{(m-1)/2} e^{-(x + 2E_w/N_0)} I_0(2\sqrt{2xE_w/N_0}),$$

and $$F_{nc}^m(x) = 1 - Q_m(2\sqrt{E_w/N_0}, \sqrt{2x}),$$

where $Q_m$ denotes the generalized Marcum's Q-function.

The simplified log-likelihood ratio is still difficult to evaluate due to the presence of both exponentials and the generalized Marcum's Q function. However, the following simple expression is a good approximation to the log-likelihood ratio:

$$\log\left(\frac{p_0^i(b_i, z_{0,max}^i = x, z_{1,max}^i = y)}{p_1^i(b_i, z_{0,max}^i = x, z_{1,max}^i = y)}\right) \approx c_1(-1)^{b_i}(E_w/N_0)(x - y).$$

The constant $c_1$ has no effect on which path is selected by the decoder and can therefore be set arbitrarily in the implementation. Insertion of the estimated SNR into the above expression yields the weighted symbol metric for $b_i$, which is given by $$\log\left(\frac{p_0^i(b_i, z_{0,max}^i = x, z_{1,max}^i = y)}{p_1^i(b_i, z_{0,max}^i = x, z_{1,max}^i = y)}\right) \approx$$

$$c_1(-1)^{b_i}(E_{w,u}/N_0)(x - y).$$

The symbol metric calculator (406) calculates the weighted symbol metric using the inputs from both the delay element (608) and the SNR estimate (404) provided by the SNR calculator (606). The delay element inserts a delay of exactly one power control group (six Walsh symbols) so that the SNR estimate required by the symbol metric calculator (406) may be calculated by the SNR calculator (606). The output of the symbol metric calculator is then passed on to the symbol metric deinterleaver (410). The function of the symbol metric deinterleaver is inversion of the operation performed by the symbol interleaver at the transmitter.

After deinterleaving, the metrics are passed to the decoder (414) which will in general be a Viterbi decoder. As the metric is defined here, the Viterbi decoder selects the codeword having the largest metric. That is, the Viterbi decoder decodes that sequence $\{b_i\}_{i=1}^{576}$ belonging to the convolutional code for which the sum of the metrics of the individual binary symbols is largest. The output (416) of the decoder (414) is the binary input sequencing corresponding to the decoded codeword.

The present invention provides a method, decoder circuit, and system for decoding a received signal in a communication system. With the present invention, it is possible to significantly reduce, relative to prior art solutions, the signal-to-noise ratio required to achieve a given bit error probability or frame error probability. In addition, this method and apparatus is less susceptible to degradation resulting from operation in environments in which the background noise $N_0$ is time varying, and a time varying background noise level $N_0$ is characteristic of the environment in which this invention will be implemented. Additionally, it should be noted that any reduction of signal-to-noise ratio required to achieve a given level of communication reliability corresponds directly to an increase in the capacity of the CDMA system in which this invention operates. Finally, it should be noted that the method is sufficiently non-complex to enable computation of the weighted symbol metric at the receiver.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method for efficiently decoding a non-coherently demodulated signal in a communication system, wherein the non-coherently demodulated signal includes a plurality of M-ary symbols each with M outputs and corresponding to k data symbols, where M equals $2^k$, and the non-coherently demodulated signal is used to calculated a signal-to-noise ratio, the method comprising the steps of:
   a) calculating k weighted symbol metrics, for each M-ary symbol, based on the signal-to-noise ratio and the M outputs to produce a plurality of weighted symbol metrics;
   b) deinterleaving, using a symbol metric deinterleaver, the plurality of weighted symbol metrics to produce a plurality of deinterleaved weighted symbol metrics; and
   c) selecting a code sequence which is maximum-likelihood using the plurality Of deinterleaved weighted Symbol metrics and providing a corresponding decoded bit sequence.

2. The method of claim 1, wherein in step a), the signal-to-noise ratio is an estimate.

3. The method of claim 1, wherein the method further comprises an initial step of calculating an estimate of the signal-to-noise ratio based on the M outputs.

4. The method of claim 3, wherein calculating an estimate of the signal-to-noise ratio uses the maximum-likelihood estimate (MLE).

5. The method of claim 3, wherein calculating an estimate of the signal-to-noise ratio further comprises the steps of:
   a) calculating an estimate of signal plus noise as a maximum of the M outputs;
   b) calculating an estimate of the noise as the average of all of the M outputs except for the maximum of the M outputs;
   c) calculating an estimate of the signal as the estimate of signal plus noise minus the estimate of the noise; and
   d) calculating an estimate of the signal-to-noise ratio by dividing the estimate of the signal by the estimate of the noise.

6. The method of claim 5, wherein the method further comprises a final step of calculating an approximately unbiased signal-to-noise ratio estimate by subtracting, from the estimate of the signal-to-noise ratio, a bias value consistent with the estimate of the signal-to-noise ratio.

7. The method of claim 1, wherein calculating k weighted symbol metrics, for each M-ary symbol, further comprises the steps of:
   a) selecting k maximum one outputs, one for each of the k data symbols, wherein a maximum one output is a largest of the M outputs for which the corresponding data symbol is a one;
   b) selecting k maximum zero outputs, one for each of the k data symbols, wherein a maximum zero output is a largest of the M outputs for which the corresponding data symbol is a zero,
   c) determining k differences between the k maximum zero outputs and the k maximum one outputs; and d) multiplying a function of the signal-to-noise ratio by each of the k differences to produce k weighted symbol metrics.

8. The method of claim 7, wherein in step d), the function of the signal-to-noise ratio is an estimate of the signal-to-noise ratio.

9. The method of claim 7, wherein in step d), the function of the signal-to-noise ratio is a non-linear function of an estimate of the signal-to-noise ratio.

10. The method of claim 7, wherein in step d), the function of the signal-to-noise ratio is the square root of an estimate of the signal-to-noise ratio.

11. The method of claim 1, wherein in step c), a Viterbi decoder is used to decode the value for the non-coherently demodulated signal.

12. An apparatus in a communication system for efficiently decoding a non-coherently demodulated signal, wherein the non-coherently demodulated signal includes a plurality of M-ary symbols each with M outputs and corresponding to k data symbols, where M equals $2^k$, and the non-coherently demodulated signal is used to calculate a signal-to-noise ratio, comprising:
  a) a symbol metric calculator for receiving the signal-to-noise ratio and the M outputs representing symbols, and calculating k weighted symbol metrics for each M-ary symbol to produce a plurality of weighted symbol metrics;
  b) a symbol metric deinterleaver, coupled to the symbol metric calculator, for deinterleaving the plurality of weighted symbol metrics and producing a plurality of deinterleaved weighted symbol metrics; and
  c) a Viterbi decoder, coupled to the symbol metric deinterleaver, for selecting a maximum-likelihood code sequence using the plurality of deinterleaved weighted symbol metrics and providing a decoded bit sequence.

13. The decoder circuit of claim 12, wherein in the symbol metric calculator, the signal-to-noise ratio is an estimate.

14. A system having an apparatus for efficiently decoding a received signal, wherein the received signal is binary encoded, bit interleaved, and modulated using M-ary modulation, where M equals $2^k$ and k is a number of data symbols, the receiver system comprising:
  a) a M-ary demodulator device for producing a non-coherently demodulated signal in response to the received signal;
  b) a square-law combiner, coupled to the M-ary demodulator, for producing M outputs from the non-coherently demodulated signal;
  c) a signal-to-noise ratio calculator, coupled to the square-law combiner, for computing a signal-to-noise ratio in response to the M outputs;
  d) a delay element, coupled to the square-law combiner, for producing M delayed outputs based upon the M outputs representing symbols from the square-law combiner;
  e) a symbol metric calculator, coupled to the signal-to-noise calculator and the delay element, for receiving the signal-to-noise ratio and the M delayed outputs and producing a plurality of weighted symbol metrics;
  f) a symbol metric deinterleaver, coupled to the symbol metric calculator, for producing a plurality of deinterleaved weighted symbol metrics utilizing the plurality of weighted symbol metrics; and
  g) a Viterbi decoder, coupled to the symbol metric deinterleaver, for selecting a maximum-likelihood code sequence using the plurality of deinterleaved weighted symbol metrics and providing a decoded bit sequence.

15. The system of claim 14, wherein the M-ary demodulator device is comprised of a plurality of M-ary demodulators for demodulating a plurality of multipath components of the received signal.

16. The system of claim 14, wherein the signal-to-noise ratio calculator produces the signal-to-noise ratio based on a predetermined power control group of the received signal.

* * * * *